(12) United States Patent
Kanojia et al.

(10) Patent No.: US 9,131,276 B2
(45) Date of Patent: *Sep. 8, 2015

(54) SYSTEM AND METHOD FOR PROVIDING NETWORK ACCESS TO ANTENNA FEEDS

(75) Inventors: Chaitanya Kanojia, West Newton, MA (US); Joseph Thaddeus Lipowski, Norwell, MA (US)

(73) Assignee: RPX Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/299,186

(22) Filed: Nov. 17, 2011

(65) Prior Publication Data

US 2012/0127374 A1 May 24, 2012

Related U.S. Application Data

(60) Provisional application No. 61/415,012, filed on Nov. 18, 2010, provisional application No. 61/422,950, filed on Dec. 14, 2010, provisional application No. 61/533,946, filed on Sep. 13, 2011.

(51) Int. Cl.
*H04N 5/445* (2011.01)
*H04N 7/20* (2006.01)
(Continued)

(52) U.S. Cl.
CPC .......... *H04N 21/6112* (2013.01); *H04H 20/57* (2013.01); *H04H 60/82* (2013.01); *H04N 5/455* (2013.01); *H04N 19/40* (2014.11); *H04N 21/2143* (2013.01); *H04N 21/2181* (2013.01); *H04N 21/2221* (2013.01); *H04N 21/2393* (2013.01); *H04N 21/2747* (2013.01); *H04N 21/4126* (2013.01); *H04N 21/41407* (2013.01); *H04N 21/43637* (2013.01); *H04N 21/6175* (2013.01); *H04H 60/51* (2013.01); *H04H 60/70* (2013.01); *H04N 21/2335* (2013.01); *H04N 21/25841* (2013.01); *H04N 21/25866* (2013.01);
(Continued)

(58) Field of Classification Search
USPC .................................. 725/63, 67–68, 72, 93
See application file for complete search history.

(56) References Cited

U.S. PATENT DOCUMENTS

| 4,721,960 | A | 1/1988 | Lait |
| 5,485,167 | A | 1/1996 | Wong et al. |

(Continued)

FOREIGN PATENT DOCUMENTS

| EP | 1895777 A1 | 3/2008 |
| JP | 2010273298 | 12/2010 |

(Continued)

OTHER PUBLICATIONS

International Search Report, mailed May 3, 2012, from International Application No. PCT/US2011/061232, filed Nov. 17, 2011.

(Continued)

*Primary Examiner* — Gigi L Dubasky
(74) *Attorney, Agent, or Firm* — Houston & Associates, LLP

(57) ABSTRACT

A method and system for capturing, storing, and streaming over the air broadcasts based on user requests is disclosed. The system and method utilize subarrays of antenna elements for receiving over the air broadcasts. Processing pipelines are used to demodulate, transcode and index the content transmissions to produce content data that are streamed to users. In this way, the feeds from antennas can be accessed by users over a network connection.

21 Claims, 13 Drawing Sheets

(51) Int. Cl.

| | |
|---|---|
| *H04N 7/173* | (2011.01) |
| *H04N 21/61* | (2011.01) |
| *H04H 20/57* | (2008.01) |
| *H04H 60/82* | (2008.01) |
| *H04N 21/214* | (2011.01) |
| *H04N 21/218* | (2011.01) |
| *H04N 21/222* | (2011.01) |
| *H04N 21/239* | (2011.01) |
| *H04N 21/2747* | (2011.01) |
| *H04N 21/41* | (2011.01) |
| *H04N 21/414* | (2011.01) |
| *H04N 21/4363* | (2011.01) |
| *H04N 5/455* | (2006.01) |
| *H04N 19/40* | (2014.01) |
| *H04H 60/51* | (2008.01) |
| *H04H 60/70* | (2008.01) |
| *H04N 21/233* | (2011.01) |
| *H04N 21/258* | (2011.01) |
| *H04N 21/434* | (2011.01) |

(52) U.S. Cl.
CPC ........ *H04N 21/4341* (2013.01); *H04N 21/4347* (2013.01)

(56) References Cited

U.S. PATENT DOCUMENTS

| | | | |
|---|---|---|---|
| 6,340,948 B1 | 1/2002 | Munoz-Garcia et al. | |
| 6,493,873 B1 | 12/2002 | Williams | |
| 6,754,907 B1 | 6/2004 | Schumacher et al. | |
| 6,871,081 B1* | 3/2005 | Llewellyn et al. | 455/561 |
| 7,109,919 B2 | 9/2006 | Howell | |
| 7,130,576 B1 | 10/2006 | Gurantz et al. | |
| 7,725,912 B2 | 5/2010 | Margulis | |
| 7,741,997 B1 | 6/2010 | Jacomb-Hood | |
| 7,813,766 B1 | 10/2010 | Lam | |
| 8,063,832 B1 | 11/2011 | Weller et al. | |
| 8,344,950 B2 | 1/2013 | Su | |
| 2002/0031224 A1 | 3/2002 | Basawapatna et al. | |
| 2002/0157112 A1 | 10/2002 | Kuhn | |
| 2003/0139980 A1 | 7/2003 | Hamilton | |
| 2003/0149988 A1* | 8/2003 | Ellis et al. | 725/87 |
| 2003/0158913 A1 | 8/2003 | Agnoli et al. | |
| 2003/0181165 A1 | 9/2003 | Sugar et al. | |
| 2003/0192054 A1 | 10/2003 | Birks et al. | |
| 2003/0192055 A1 | 10/2003 | Aoki et al. | |
| 2003/0233580 A1 | 12/2003 | Keeler et al. | |
| 2004/0015992 A1 | 1/2004 | Hasegawa et al. | |
| 2004/0117834 A1 | 6/2004 | Karaoguz et al. | |
| 2004/0117846 A1 | 6/2004 | Karaoguz et al. | |
| 2004/0154040 A1 | 8/2004 | Ellis | |
| 2004/0193648 A1 | 9/2004 | Lai et al. | |
| 2004/0252243 A1* | 12/2004 | Stewart | 348/725 |
| 2005/0022242 A1 | 1/2005 | Rosetti et al. | |
| 2005/0076375 A1 | 4/2005 | Nakamura | |
| 2005/0275758 A1 | 12/2005 | McEvilly et al. | |
| 2006/0015580 A1* | 1/2006 | Gabriel et al. | 709/219 |
| 2006/0064757 A1 | 3/2006 | Poslinski | |
| 2006/0080703 A1 | 4/2006 | Compton | |
| 2006/0259927 A1 | 11/2006 | Acharya et al. | |
| 2007/0040890 A1 | 2/2007 | Morioka et al. | |
| 2007/0067817 A1 | 3/2007 | Hamilton et al. | |
| 2007/0237330 A1 | 10/2007 | Srivastava | |
| 2007/0240192 A1 | 10/2007 | Acharya et al. | |
| 2007/0276926 A1 | 11/2007 | LaJoie et al. | |
| 2008/0005770 A1 | 1/2008 | Acharya et al. | |
| 2008/0059533 A1 | 3/2008 | Krikorian | |
| 2008/0060035 A1 | 3/2008 | Tsang et al. | |
| 2008/0129864 A1 | 6/2008 | Stone et al. | |
| 2008/0162713 A1 | 7/2008 | Bowra et al. | |
| 2008/0267108 A1* | 10/2008 | Zhang et al. | 370/312 |
| 2008/0307478 A1 | 12/2008 | Kim et al. | |
| 2009/0007190 A1 | 1/2009 | Weber et al. | |
| 2009/0036147 A1* | 2/2009 | Romano | 455/456.3 |
| 2009/0083792 A1 | 3/2009 | Narita | |
| 2009/0113492 A1 | 4/2009 | Norin et al. | |
| 2009/0172685 A1 | 7/2009 | Shavit | |
| 2009/0196371 A1 | 8/2009 | Yamamoto et al. | |
| 2009/0268835 A1* | 10/2009 | Imai et al. | 375/267 |
| 2009/0317065 A1 | 12/2009 | Fyock et al. | |
| 2010/0009638 A1 | 1/2010 | Saito | |
| 2010/0125888 A1 | 5/2010 | Jerram | |
| 2010/0231354 A1 | 9/2010 | Nishiguchi et al. | |
| 2010/0281042 A1 | 11/2010 | Windes et al. | |
| 2010/0319044 A1 | 12/2010 | Agans et al. | |
| 2011/0247061 A1 | 10/2011 | Loveland et al. | |
| 2012/0127363 A1 | 5/2012 | Kanojia et al. | |
| 2012/0129479 A1 | 5/2012 | Kanojia et al. | |
| 2012/0131621 A1 | 5/2012 | Kanojia et al. | |
| 2012/0266198 A1 | 10/2012 | Kanojia et al. | |
| 2012/0266201 A1 | 10/2012 | Kanojia et al. | |
| 2013/0109295 A1 | 5/2013 | Lipowski et al. | |
| 2013/0191858 A1 | 7/2013 | Kanojia et al. | |

FOREIGN PATENT DOCUMENTS

| | | |
|---|---|---|
| WO | 2006014739 A2 | 2/2006 |
| WO | 2006107350 A1 | 10/2006 |
| WO | 2007064380 A1 | 6/2007 |
| WO | 2009071132 A1 | 6/2009 |
| WO | 2010030627 A1 | 3/2010 |
| WO | 2012/068395 A1 | 5/2012 |

OTHER PUBLICATIONS

International Search Report, mailed Aug. 7, 2012, from International Application No. PCT/US2012/025676, filed Feb. 17, 2012.
Boudier, T. et al., "VIDOS, a system for video editing and format conversion over the Internet," Computer Networks, vol. 34, 2000, pp. 931-944.
Wheeler, H. A., "Fundamental Limitations of Small Antennas," Proceedings of the IRE, vol. 35, Dec. 1947, pp. 1479-1484.
"Apple vs. Google: The Stakes are Rising," The Wall Street Journal, accessed on Feb. 10, 2012.
International Search Report, mailed Nov. 2, 2012, from International Application No. PCT/US2012/025707, filed Feb. 17, 2012.
Partial International Search Report, mailed Jun. 6, 2012, from International Application No. PCT/US2012/025658, filed Feb. 17, 2012.
SplashCast is Social TV, downloaded from Internet on Sep. 6, 2011.
International Preliminary Report on Patentability and the Written Opinion of the International Searching Authority mailed May 30, 2013, from counterpart International Application No. PCT/US2011/061232, filed on Nov. 17, 2011.

* cited by examiner

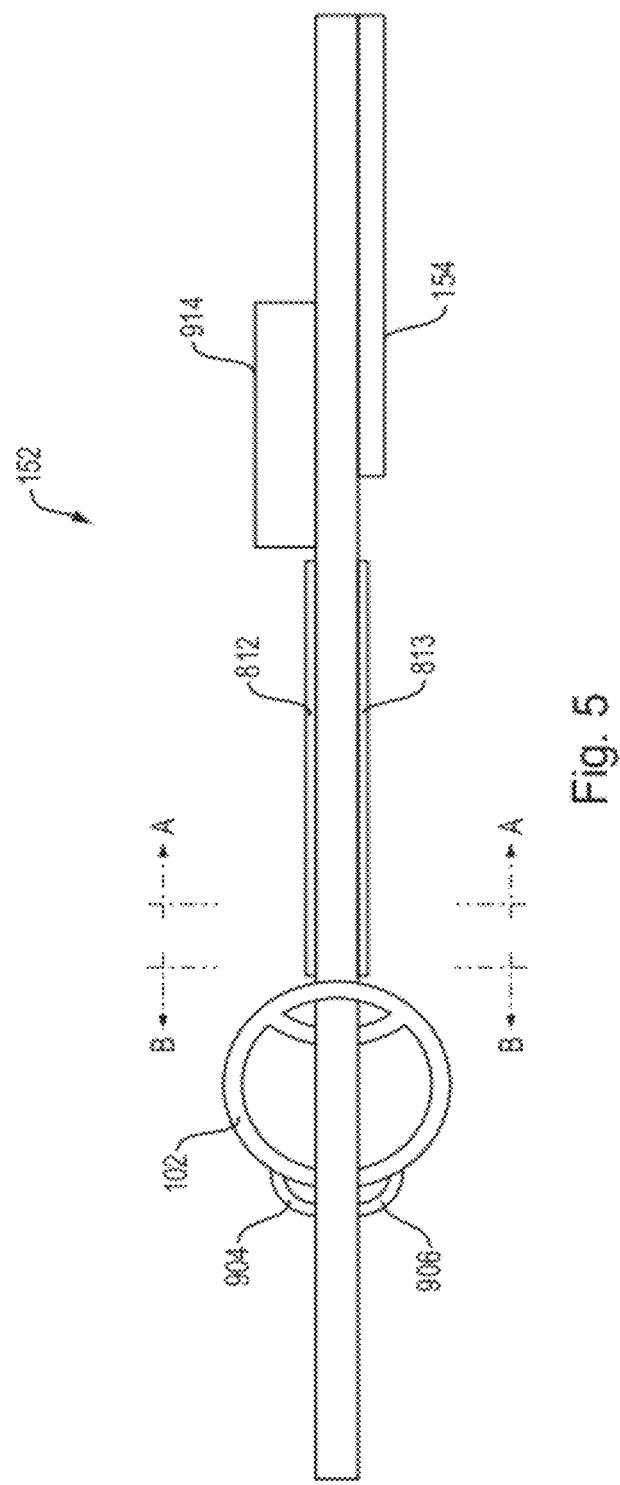

Broadcast file store 120

| USER ID | CONTENT ID | ANTENNA ID | NETWORK ID | VIDEO FILE | FILE ID | TIME / DATE |
|---|---|---|---|---|---|---|
| User 1 | Law and Order | Antenna 1 | NBC | File pointer | Episode123 | 10am / 10-22-10 |
| User 2 | Law and Order | Antenna 2 | NBC | File pointer | Episode123 | 10am / 10-22-10 |
| User 3 | Survivor | Antenna n | CBS | File pointer | Episode456 | 3pm / 12-15-10 |
| ... | ... | ... | ... | ... | ... | ... |
| User ~ n | Law and Order | Antenna 45 | NBC | File pointer | Episode123 | 10am / 10-22-10 |

Fig. 11

SYSTEM AND METHOD FOR PROVIDING NETWORK ACCESS TO ANTENNA FEEDS

RELATED APPLICATIONS

This application claims the benefit under 35 USC 119(e) of U.S. Provisional Application No. 61/415,012, filed on Nov. 18, 2010, U.S. Provisional Application No. 61/422,950, filed on Dec. 14, 2010, and U.S. Provisional Application No. 61/533,946, filed on Sep. 13, 2011, all of which are incorporated herein by reference in their entirety.

This application is related to U.S. application Ser. No. 13/299,191 filed on Nov. 17, 2011, now U.S. Patent Publication No. US 2012/0131621 A1, U.S. application Ser. No. 13/299,194 filed on Nov. 17, 2011, now U.S. Patent Publication No. US 2012/0127363 A1, and U.S. application Ser. No. 13/299,198 filed on Nov. 17, 2011, now U.S. Patent Publication No. US 2012/0129479 A1, all of which are incorporated herein by reference in their entirety.

BACKGROUND OF THE INVENTION

Over the air television, which is also referred to as terrestrial television or broadcast television, is a distribution mode for television content via radio frequency (RF) electromagnetic waves or radiation through the atmosphere. Some examples of well known television networks in the United States that broadcast over the air content are ABC, CBS, FOX, NBC, and PBS. Through a series of affiliate stations, these networks are able to blanket the country with broadcasted content. The result is that each one of these television networks is able to reach over 95% of all the households in the United States.

Television networks are always looking for ways to attract new customers and increase viewership. Recently, some television networks have been putting their programming online for people to access via private and public data networks such as the Internet. Typically, the television networks will upload content to their website or some other third party website, such as HULU.COM, that stream the content to users, sometimes for a fee. Today, the content that is available is often limited; sometimes, the most recent episodes are not available or the content is outdated.

At the same time, a wide variety of devices are available that can play audio and video content. In addition to the ubiquitous television, many now watch video on their personal computers and mobile computing devices, such as smartphones and tablet computers. Video content is usually accessed through the Internet using subscriber data networks, cellular phone networks, and public and private wireless data networks. Moreover, some televisions now have network connections. And, many game consoles have the ability to access video content using third-party software such as provided by Netflix, Inc.

SUMMARY OF THE INVENTION

Despite all of the new modalities for viewing video, over the air content broadcast by the traditional television networks is still generally only available through cable television subscriptions, satellite television systems, or by capturing the over the air broadcasts with a home-installed antenna. For users that do not subscribe to cable or do not have cable access, it is generally required that they install their own RF or satellite antenna in order to capture this broadcast content. Then, this captured content is generally only available for display on a traditional television. There is generally no simple way for a user to have this content available to their other video-capable devices.

The present system and method concern an approach to enabling users to separately access individual antenna feeds over a network connection, such as the Internet and/or service provider network. Each user is assigned an antenna, such as their own, separate, individual antenna, from which they can then record and/or stream content transmissions from over the air broadcasts. That assignment may happen either as the user initiates a recording or a user may be exclusively assigned a specific antenna for their sole use for any and all of their viewing and recordings. As users select content transmissions, individual antennas receive the broadcast content. At the users' election, the system stores the content data to each of the users' individual accounts separately for later playback by that user and/or streams the content data to the separate users. In this way, the users can access broadcast content without having to maintain their own antenna infrastructure and access broadcast content on devices, such as mobile device, that lack the tuners and decoders necessary to directly access over the air broadcasts.

The antenna assignment is either permanent or temporary depending on the mode of operation. In one mode, when users select to receive over the air content or record over the air content for later viewing, corresponding antenna elements and encoding resources are allocated to the users on the fly. Then, after the antenna elements are no longer needed, the resources are returned to the resource pool and become available for other users. In the other mode, users lease or buy particular antenna elements, which are then exclusively assigned to particular users and then used to service the requests of those users. In one example, the antenna elements are leased to users for the duration of those users' accounts.

In general, according to one aspect, the invention features a method of streaming content transmissions from over the air broadcasts to user devices. The method includes presenting users with a list of available content transmissions, receiving requests from the users to receive selected content transmissions among the available content transmissions, receiving the selected content transmission with antenna elements for each individual user, and streaming the selected content transmissions to the user devices.

In embodiments, the antenna elements are tuned to receive the selected content transmissions from broadcasting entities. The feeds from the antenna elements are demodulated to generate content transmission data. The content transmission data are then transcoded to a different encoding, such as from MPEG-2 to MPEG-4 encoding. The content transmission data can also be transcoded to a two or more different resolutions.

Typically, the transcoded content transmission data is streamed to the user devices with a resolution determined based on resolution of the user devices.

In an embodiment, the selected content transmissions are stored in file store prior to streaming the selected content transmissions to the users, and in a separate location for each individual user.

In one example, the antenna elements are assigned to the users from available antenna elements based on which antenna elements are optimized to receive the selected content transmissions of the users.

Typically, the list of available content transmissions is based on the over the air broadcasts available in a geographical location of each of the users.

In one mode, antenna elements are assigned on the fly as users request content transmissions. In another mode, antenna elements are dedicated to users that are used to fulfill the requests for content transmissions.

In general, according to another aspect, the invention features a system for streaming content transmissions to user devices. The system includes an application server presenting users with a list of available content transmissions, wherein the application server receives requests from the user devices to receive selected content transmissions among the available content transmissions. The system further includes an antenna controller that controls antenna elements to receive the selected content transmissions for each individual user, and a streaming server that streams the selected content transmissions as content data to the user devices.

In general, according to another aspect, the invention features a system for capturing over the air broadcasts. The system includes subarrays of antenna elements for receiving over the air broadcasts of content transmissions, each sub array of antenna elements being optimized to receive over the air broadcasts from different broadcasting entities. The system further includes an application server that receives user requests for content transmissions from the broadcasting entities and an antenna controller that assigns individual antenna elements to each of the users based on which subarray of antenna elements is optimized to detect the broadcasting entities generating the content transmissions requested by the users.

In general, according to another aspect, the invention features a method for capturing over the air broadcasts. The method includes receiving over the air broadcasts of content transmissions with subarrays of antenna elements, each subarray of antenna elements being optimized to receive over the air broadcasts from different broadcasting entities. The method further includes receiving user requests for content transmissions from the broadcasting entities, and assigning individual antenna elements among from the subarrays to receive the content transmissions for each of the individual users based on which of the subarrays is optimized to detect the broadcasting entities generating the content transmissions.

In general, according to another aspect, the invention features a system for streaming content transmissions to user devices. The system comprises an application server presenting users with a list of available content transmissions, wherein the application server receives requests from the user devices to receive selected content transmissions among the available content transmissions. An antenna controller controls antenna elements to receive the selected content transmissions for each individual user and assigns antenna elements that are currently not being used by users to receive content transmissions that it anticipates that users will want to watch in the future. Finally, a streaming server streams the selected content transmissions as content data to the user devices, and when a user desires to watch one of the anticipated content transmissions, the content data that are generated by the feed from the antenna elements are allocated to that user and streamed to that user.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 5 is a side view of the PCB board that shows the symmetry of balanced loop antennas and balanced transmission lines on the PCB.

FIG. 11 illustrates the database architecture for storing broadcast content data in the broadcast file store.

DETAILED DESCRIPTION OF THE PREFERRED EMBODIMENTS

Figure 1:
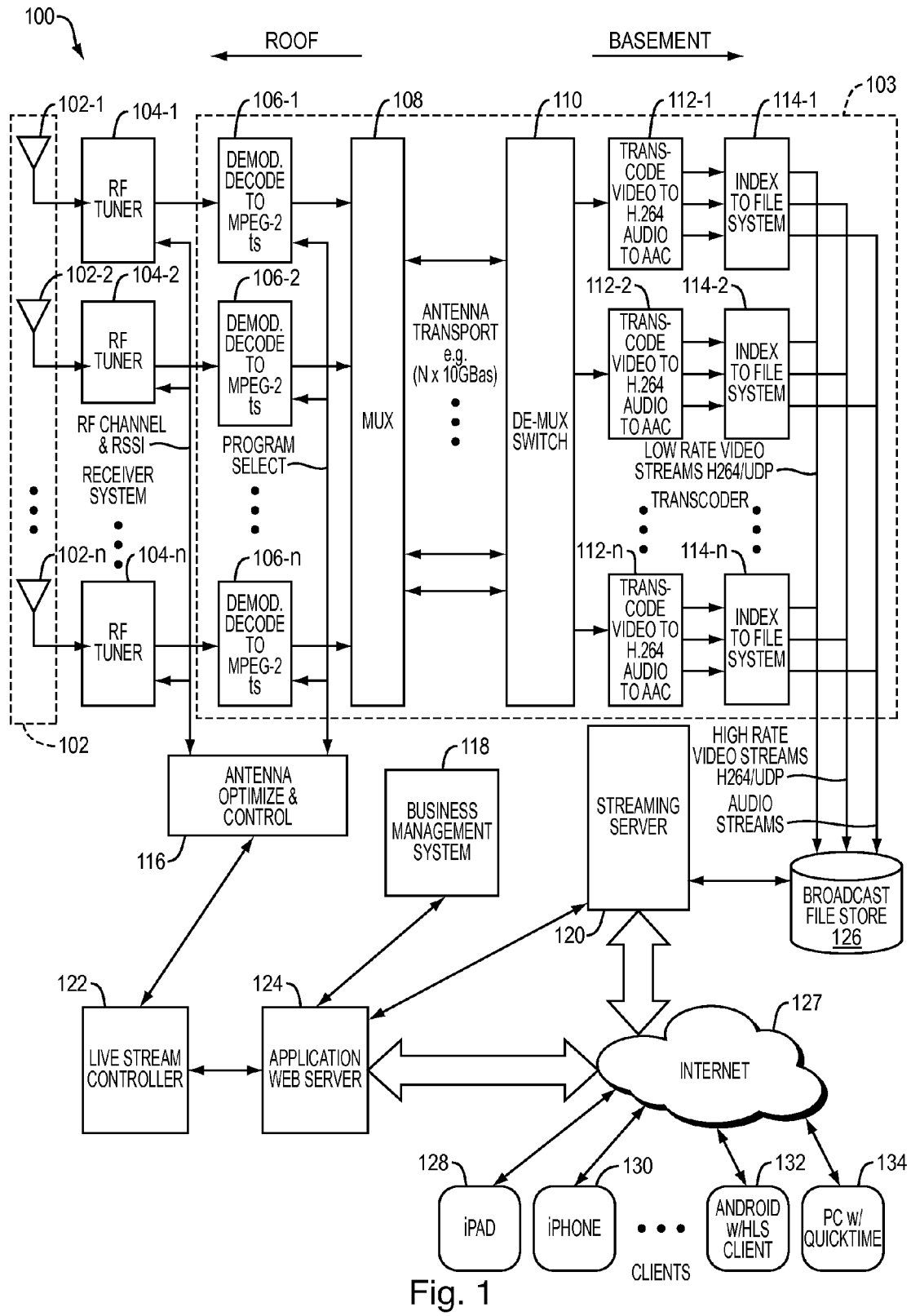
FIG. 1 is a block diagram illustrating a system for the capture and distribution of terrestrial television content.

FIG. 1 shows a system 100 that enables individual users to receive terrestrial television content from antennas via a packet network such as the Internet, which has been constructed according to the principles of the present invention. The system allows each user to separately access the feed from an individually-assigned antenna for recording or live streaming.

In a typical implementation, users access the system 100 via the Internet 127 with client devices 128, 130, 132, 134. In one example, the client device is a personal computer 134 that accesses the system 100 via a browser. The video content is displayed on the personal computer using HTML-5 or a program such as QuickTime by Apple Corporation. In other examples, the system 100 is accessed by mobile devices such as a tablet, e.g., iPad, mobile computing device, mobile phone, e.g., iPhone, computing device, or mobile computing devices running the Android operating system by Google Inc. Here, also HTML-5 is used in some implementations to provide the video. Other examples are televisions that have network interfaces and browsing capabilities. Additionally, many modern game consoles and some televisions also have the ability to run third-party software and provide web browsing capabilities that can be deployed to access the video from the system 100 over a network connection.

An application server 124 manages these requests or commands from the client devices 128, 130, 132, 134. It allows the users at the client devices to select whether they want to watch or access previously recorded content, i.e., a television program, set up a future recording of a broadcast of a television program, or watch a live broadcast television program. In some examples, the system 100 also enables users to access and/or record radio (audio-only) broadcasts. A business management system 118 is used to verify the users' accounts or help users set up a new account if they do not yet have one.

If the users request to watch previously recorded content, then the application server 124 sends the users' command to the streaming server 120. The streaming server 120 retrieves each users' individual copy of the previously recorded content from a broadcast file store (or file store) 126 and streams content data to the client devices 128, 130, 132, 134.

If the users request to set up future recordings or watch a live broadcast of television programs, the application server 124 communicates with an antenna optimization and control system 116 to configure broadcast capture resources to capture and record the desired broadcast content by reserving antenna and encoding resources for the time and date of the future recording.

On the other hand, if the users request to watch a live broadcast, then the application server 124 and antenna optimization and control system 116 locate available antenna resources ready for immediate use. In current embodiments, all content, initiated by the user, is temporarily stored in the streaming server 120 and/or file store 126 prior to playback and streaming to the users whether for live streaming or future recording. This allows users to pause and replay parts of the television program and also have the program stored to be watched again. The antenna optimization and control system 116 maintains the assignment of this antenna to the user throughout any scheduled television program or continuous usage until such time as the user releases the antenna by closing the session or by the expiration of a predetermined time period as maintained by a timer implemented in the control system 116. An alternative implementation would have each antenna assigned to a particular user for the user's sole usage.

The broadcast capture portion of the system 100 includes an array 102 of antenna elements 102-1, 102-2 . . . 102-n. Each of these elements 102-1, 102-2 . . . 102-n is a separate antenna that is capable of capturing different terrestrial television content broadcasts and, through a digitization and encoding pipeline, separately process those broadcasts for storage and/or live streaming to the user devices. This configuration allows the simultaneous recording of over the air broadcasts from different broadcasting entities for each of the users. In the illustrated example, only one array of antenna elements is shown. In a typical implementation, however, multiple arrays are used, and in some examples, the arrays are organized into groups.

In more detail, the antenna optimization and control 116 determines which antenna elements 102-1 to 102-n within the antenna array 102 are available and optimized to receive the particular over the air broadcasts requested by the users. In some examples, this is accomplished by comparing RSSI (received signal strength indicator) values of different antenna elements. RSSI is a measurement of the power of a received or incoming radio frequency signal. Thus, the higher the RSSI value, the stronger the received signal.

After locating an optimized antenna element, the antenna optimize and control 116 allocates the antenna element to the user. The antenna optimization and control system 116 then signals the corresponding RF tuner 104-1 to 104-n to tune the allocated antenna element to receive the broadcast.

The received broadcasts from each of the antenna elements 102-1 to 102-n and their associated tuners 104-1 to 104-n are transmitted in parallel to an encoding system 103 as content transmissions. The encoding system 103 is comprised of encoding components that create parallel processing pipelines for each allocated antenna 102-1 to 102-n and tuner 104-1 to 104-n pair.

The encoding system demodulates and decodes the separate content transmissions from the antennas 102 and tuners 104 into MPEG-2 format using an array of ATSC (Advanced Television Systems Committee) decoders 106-1-106-n assigned to each of the processing pipelines. In a situation where each broadcast carrier signal contains multiple content transmissions, the antenna optimization and control system 116 signals the ATSC decoders (or demodulators) 106-1 to 106-n to select the desired program contained on the carrier signal. The content transmissions are decoded to MPEG-2 content transmission data because it is currently a standard format for the coding of moving pictures and associated audio information.

The content transmission data from the ATSC decoders 106-1 to 106-n is sent to a multiplexer 108. The content transmissions are then transmitted across an antenna transport interconnect to a demultiplexer switch 110. In a preferred embodiment, the antenna transport interconnect is an nx10GbE optical data transport layer.

In the current implementation, the antenna array 102, tuners 104-1 to 104-n, demodulators 106-1 to 106-n, and multiplexer 108 are located outside in an enclosure such as on the roof of a building or on an antenna tower. These components can be made to be relatively robust against temperature cycling that would be associated with such an installation. Also, these components are relatively inexpensive so that loss can be minimized in the event of damage sustained as the result of electrical discharge or vandalism.

The multiplexer 108, demultiplexer switch 110, and nx10GbE data transport are used to transmit the captured content transmission data to the remainder of the system that is preferably located in a secure location such as a ground-level but or the basement of the building, which also usually has a better control over the ambient environment.

The content transmission data of each of the antenna processing pipelines are then transcoded into a format that is more efficient for storage and streaming. In the current implementation, the transcode to the MPEG-4 (also known as H.264) format is affected by an array of transcoders 112-1, 112-2 . . . 112-n. Typically, multiple transcoding threads run on a single signal processing core, FPGA or ASIC type device.

The content transmission data are transcoded to MPEG-4 format to reduce the bitrates and the sizes of the data footprints. As a consequence, the conversion of the content transmission data to MPEG-4 encoding will reduce the picture quality or resolution of the content, but this reduction is generally not enough to be noticeable for the average user on a typical reduced resolution video display device. The reduced size of the content transmissions will make the content transmissions easier to store, transfer, and stream to the user devices. Similarly, audio is transcoded to AAC in the current embodiment, which is known to be highly efficient.

In one embodiment, the transcoded content transmission data are sent to a packetizers and indexers 114-1, 114-2 . . . 114-n of the pipelines, which packetize the data. In the current embodiment, the packet protocol is UDP (user datagram protocol), which is a stateless, streaming protocol. UDP is a simple transmission model that provides less reliable service because datagrams may arrive out of order, duplicated, and go missing. Generally, this protocol is preferred for time-sensitive transmission, such as streaming files, where missing or duplicated packets can be dropped and there is no need to wait for delayed packets Also, in this process, time index information is added to the content transmissions. The content data are then transferred to the broadcast file store 126 for storage to the file system, which is used to store and/or buffer the content transmissions as content data for the various television programs being captured by the users.

In an alternative embodiment, the content data are streamed as HTTP Live Streaming or HTTP Dynamic Streaming. These are streaming protocols that are dependent upon the client device. HTTP Live Streaming is a HTTP-based media streaming communications protocol implemented by Apple Inc. as part of its QuickTime X and iPhone software systems. The stream is divided into a sequence of HTTP-based file downloads.

Figure 2:
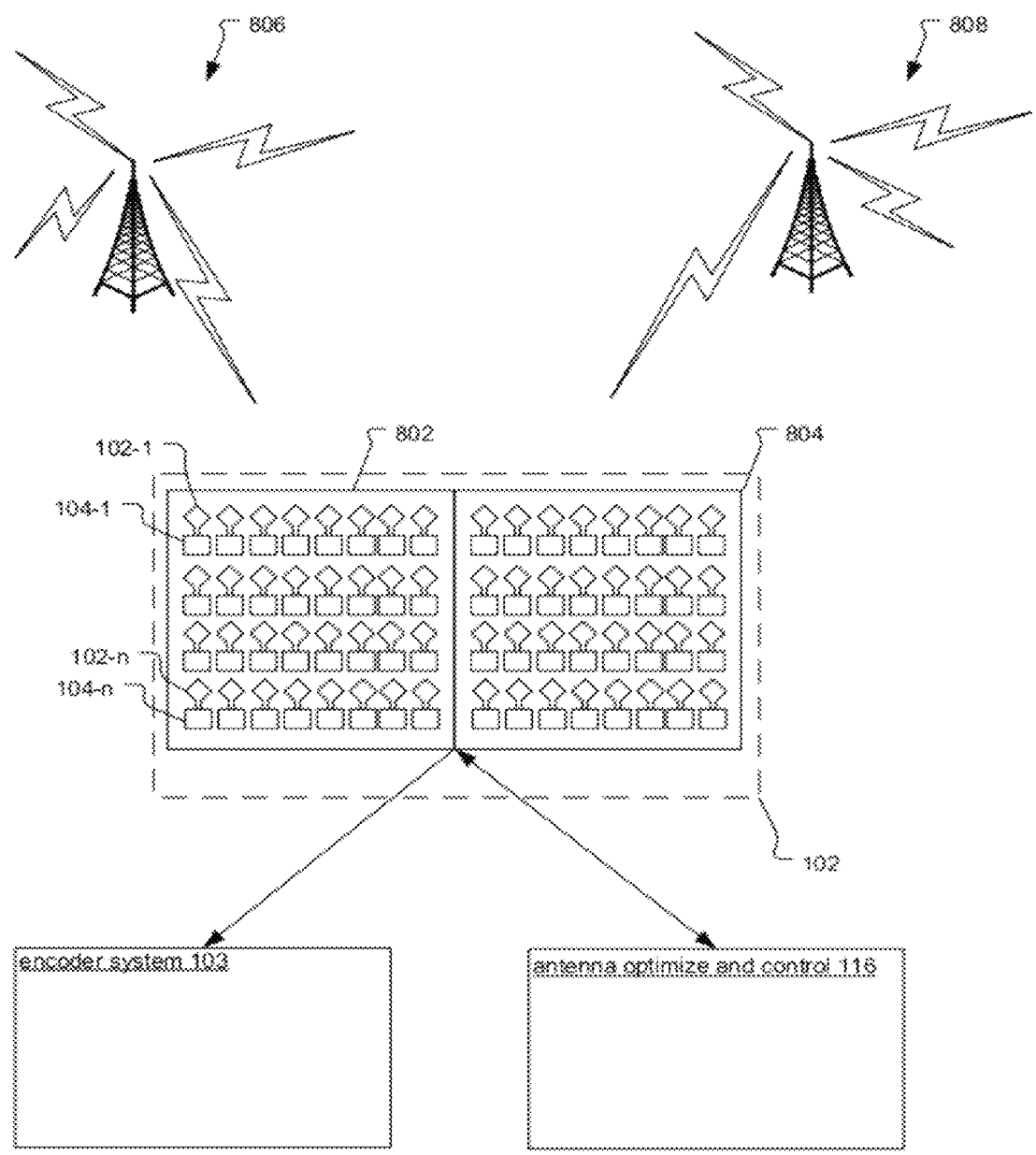
FIG. 2 is a schematic diagram showing different antennas subarrays optimized to capture broadcasts from different broadcasting entities.

FIG. 2 is a block diagram showing one implementation of the antenna array 102 that includes different subarrays 802, 804. Generally, different subarrays capture terrestrial broadcasts from different broadcasting entities 806, 808.

Each of the subarrays 802, 804 is comprised of hundreds or thousands of antennas elements 102-1 to 102-n, and tuners 104-1 . . . 104-n. Generally, the antenna elements and tuners are mounted on printed circuit boards (PCB) and located within an enclosure or housing. Depending on their orientation and location, different antenna subarrays 802, 804 are optimized to receive broadcasts from different broadcasting entities 806, 808. This is because different television networks use different broadcasting entities or antennas 806, 808 for generating the radio frequency transmissions or carrier waves that encode the over the air broadcasts. Typically, the broadcasting antennas 806, 808 are often physically located in different places distributed around most metropolitan areas, on one hand. It is preferable that the antenna array 102 be physically small and have a high antenna density, on the other hand. This leads to the desire to make the antenna elements 102 physically small. Small antennas, however, typically are low power gain. Therefore, in one embodiment, the system 100 includes two or more antenna subarrays 802, 804 that are physically separated from each other so that they can be collocated with the transmission towers of different broadcasting entities 806, 808, from which the over the air broadcast transmissions are to be detected by the system 100.

In operation, the antenna optimization and control system 116 determines which antennas subarray 806, 808 is optimized to receive a desired content broadcast from the broadcasting entity 806, 808 based on a variety of factors including the location of the broadcasting entity, the location of the antennas subarray, and/or the signal strength received by the subarray. The antenna optimization and control system 116 then assigns an available antenna element 102 within the best-located subarray 802, 804 to receive the desired broadcast content.

Further, in some embodiments, the antenna subarrays 802, 804 are further preferably organized into groups according to frequency range: VHF and UHF, since the physical requirements of the antenna elements are different depending on the frequencies that they are able to receive.

With reference to FIGS. 1 and 2, the arrangement of the antenna elements 102 in each of the subarrays 802, 804 is similar to a phased array antenna in some ways. However, in a phased array antenna, the antenna elements are typically driven from a common source or connected to a common detection channel to produce a controlled radiation emission or detection pattern. In contrast, in the current system, the different antenna elements 102-1 to 102-n have separately addressable tuners 104-1 to 104-n and are controlled and optimized to receive different over the air broadcasts at different frequencies and possibly from different broadcasting entities 806, 808, simultaneously. Additionally, the different antennas 102-1 to 102-n and tuners 104-1 to 104-n are able to simultaneously capture multiple copies of the same broadcast of content transmission; this occurs when different users want to record or watch the same television program. As a result, each user has a unique copy of broadcast content data, which is generated from a different antenna and which is then separately stored in the broadcast file store 126. Moreover, should one of these antenna elements be physically or electrically compromised and therefore disabled, that particular user's stream will cease to be generated and received.

Figure 3:
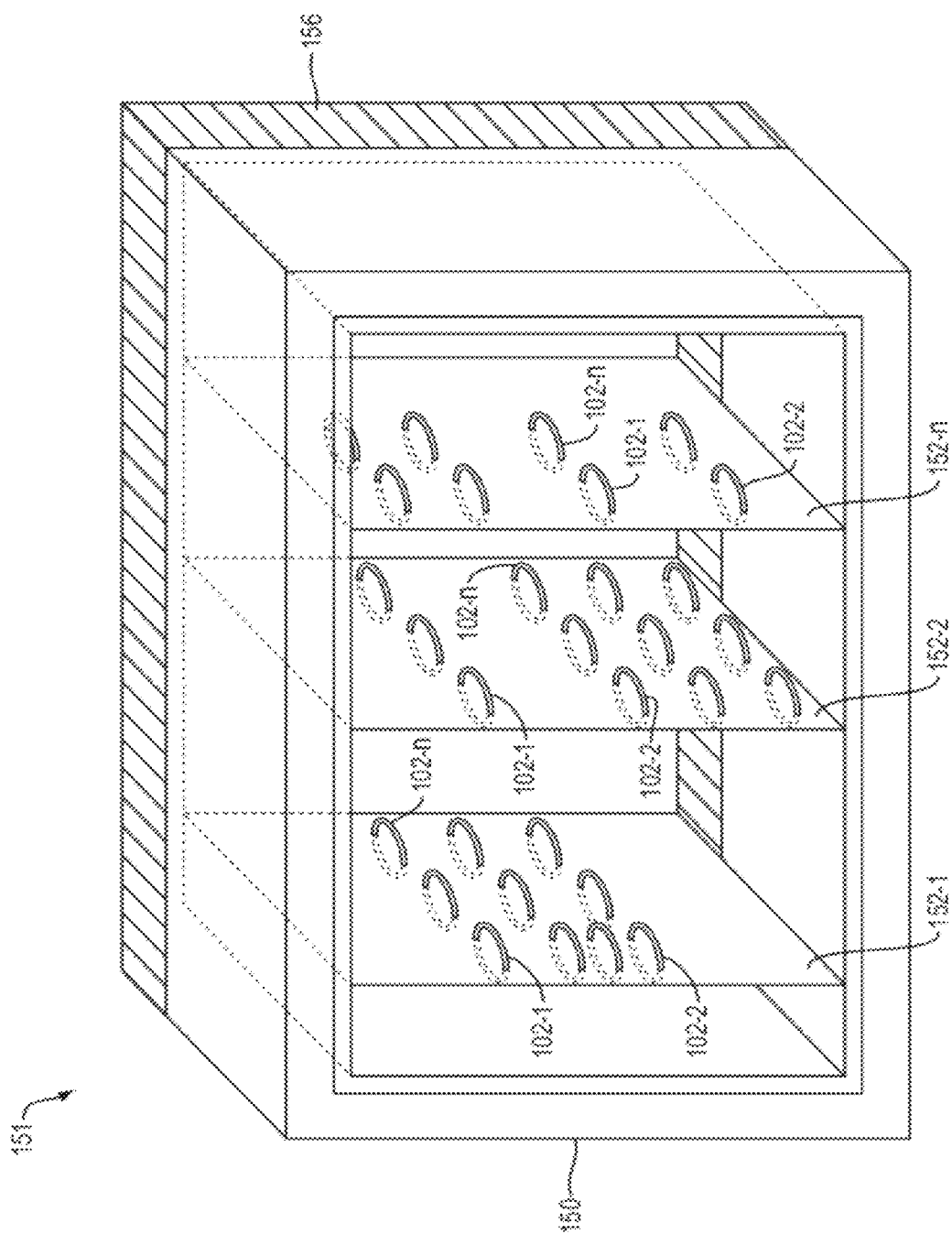
FIG. 3 is a schematic perspective diagram of the card cage structure that functions as a housing for two dimensional antenna arrays on printed circuit boards (PCBs) such that the boards are supported adjacent to each other to create a three dimensional array.

FIG. 3 is diagram of a card cage structure 151 housing antenna array PCBs (or PCB antenna arrays) 152-1, 152-2 . . . 152-n.

In the preferred embodiment, multiple PCB antenna arrays 152-1 to 152-n are installed in card cage structure or housing 151 and the antenna elements 102-1, 102-2 . . . 102-n are orientated horizontally. The card cage 151 is typically an enclosure or structure that provides mechanical support and protection of the PCB antenna arrays 152-1 to 152-n within its enclosure. The card cages 151 are generally designed to allow PCBs to be easily installed and/or removed. Additionally, multiple card cages are often housed in rack mounted chassis (not shown) to further increase the density of antenna elements in the location where the card cages are placed.

The side, top, bottom and any front walls 150 of the card cage structure 151 are fabricated from a non-conductive material or with as few conductive materials as possible to minimize Faraday shielding. The front wall (shown removed) of the card cage 151 provides an access panel to enable installation and removal of the PCB antenna arrays 152-1, 152-2 . . . 152-n.

The rear wall or section includes the data transport interfaces, such as an nx10GbaseT optical data transport connector to transfer the data the transcoders, and connectors providing mechanical support for the PCBs antenna arrays 152-1 to 152-n. In a typical implementation, the card cage 151 houses up to 8 or up to 32 PCB antenna arrays. In alternative embodiments, however, greater or fewer PCBs antenna arrays are housed within the card cages.

The PCBs antenna arrays 152-1 to 152-n are generally spaced about an inch (2.5 centimeters) apart within the enclosure. This distance enables a relatively high density for the PCBs antenna arrays 152-1 to 152-n, while reducing unwanted interference between antenna elements to acceptable levels. Additionally, the arrangement of the multiple PCB antenna arrays within the enclosure creates a three dimensional array of antennas to maximize the number of antenna elements in the location where the card cages are placed.

The antenna elements 102-1 to 102-n within the card cage 151 are orientated horizontally to create a horizontally polarized half omni-directional antenna array.

If the signal transmitted from the broadcasters has a vertical polarization, which occurs in some locals, then orientation of the antenna elements 102-1 to 102-n should be changed.

The PCB antenna arrays 152-1, 152-2 . . . 152-n are fabricated from a dielectric insulator material. The components are mounted to a PCB and are connected via conductive pathways (or tracks) on the PCB. In one embodiment, the PCBs are approximately 25 inches wide by 21 inches long, or about 0.6 meters (m) by 0.5 m.

Figure 4:
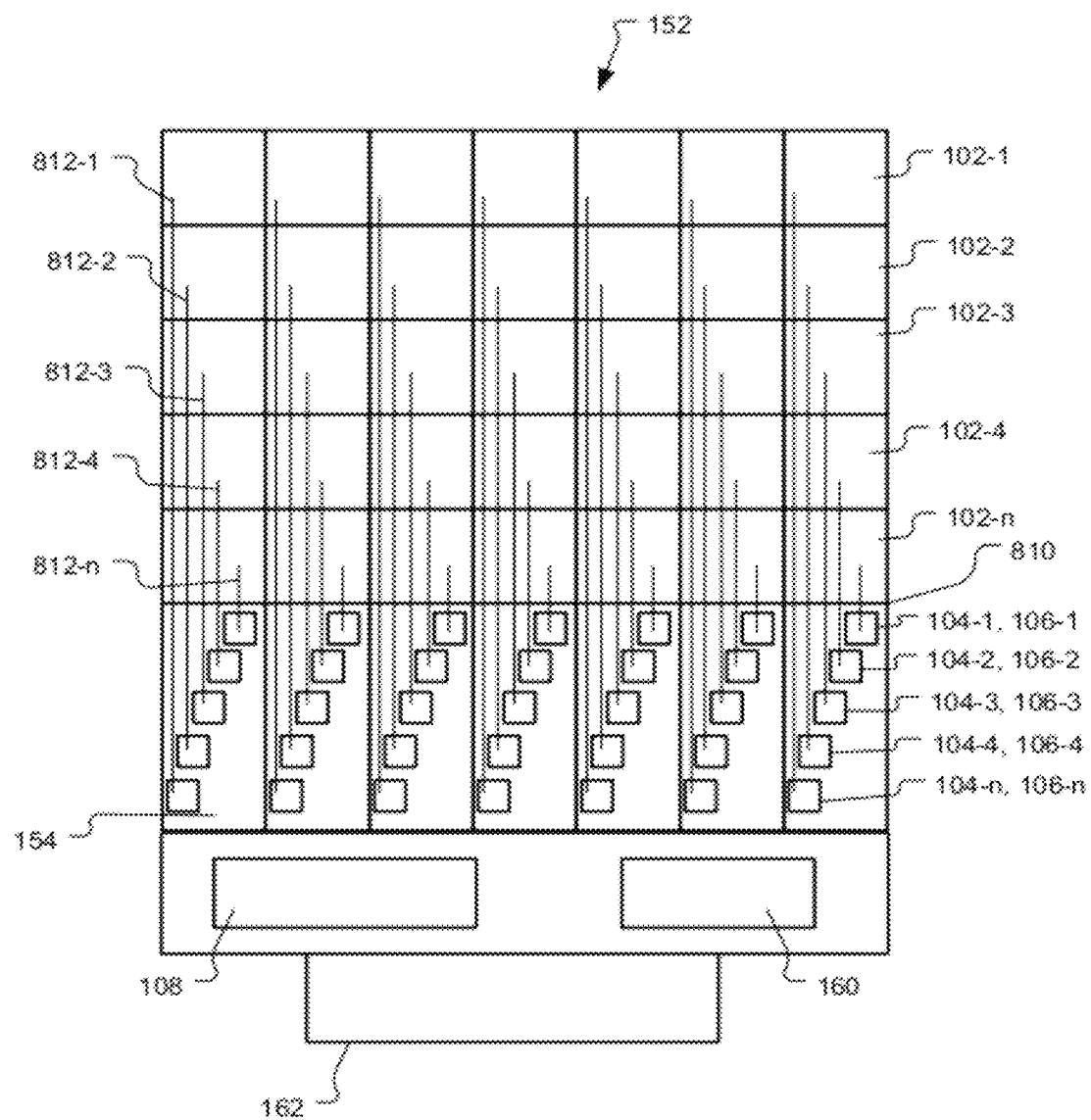
FIG. 4 is a schematic diagram illustrating a two dimensional array of antennas on a printed circuit board.

FIG. 4 is a top view diagram illustrating a two dimensional array of antenna elements 102-1, 102-2 . . . 102-n (shown as an array of squares) in the PCB antenna arrays 152.

In a preferred embodiment, antenna elements 102-1, 102-2 . . . 102-n are mounted to both sides of the PCB 152 in a two dimensional array. Note that in FIG. 4, only the antenna elements in the right-most column are labeled. Each antenna element 102-1, 102-2 . . . 102-n is an electrically balanced symmetric loop, in one implementation. The antenna elements are tightly spaced, much less than 0.1 wavelength (lambda) apart on the antenna section of the PCB. In a preferred embodiment, the antenna elements 102-1, 102-2 . . . 102-n are low power gain antennas. Low gain antennas are preferred because they have a wide radiation pattern that does not need to be aimed precisely at a transmitting entity and is generally required for highly integrated arrays at these frequencies/wavelengths.

Further, the antenna elements may be preferably arranged on different PCBs according to frequency range because the physical characteristics of the antenna elements are different depending on the frequencies that it is designed to receive. Thus, the PCB 152 includes VHF or UHF antenna elements. In an alternate embodiment, antenna elements may be multiply resonant, and may be on the same PCB.

The antenna elements 102-1, 102-2 . . . 102-n are connected with solder to the electronics section 154 of the PCB antenna array 152. A ground plane 810 is provided in the electronics section 154. In a preferred embodiment, the conductive metal ground plane begins at this electronics section and extends in both directions.

Carrying the signal from each antenna element 102-1 to 102-n to the radio frequency tuner 104-1 to 104-n and demodulator 106-1 to 106-n are balanced transmission lines 812-1, 812-2 . . . 812-n. In one embodiment, each individual antenna element 102-1, 102-2 . . . 102-n is connected to a corresponding radio frequency tuner 104-1, 104-2 . . . 104-n and demodulator 106-1, 106-2 . . . 106-n. Thus, there will be the same number of antennas, radio frequency tuners, and demodulators.

In an alternative embodiment, there are more antenna elements than tuners such that antennas may be assigned to tuners as needed. This enables the system to provision either stream without prejudice or delay. It further helps to provide an economical method so that a user may be guaranteed that their particular antenna throughout the duration of their agreed time usage period whether or not they are actively using the antenna. This can be considered a pooled tuner or pooled receiver. In another alternative embodiment, the system utilizes pooled demodulation resources. Typically, there are between three to four times more antenna elements than demodulators. That ratio, however, will vary based on the total number of users with accounts, the average number of users accessing the system simultaneously, and the number of users accessing the system during peak hours.

The balanced transmission lines 812 include two uniform conductors of the same material type that have equal impedance along their length. Balanced transmission lines are used to carry the signal because the interfering noise from the surrounding environment is induced into both lines equally and with resulting electrical currents in the same direction. Then, by measuring the difference of the signals at the receiving end of the transmission lines, the original signal is recovered.

A balanced to unbalanced transformer or balun (See FIG. 5, reference numeral 914) is used to convert the balanced signal from the antenna elements 102-1, 102-2 . . . 102-n to an unbalanced signal. The unbalanced to balanced conversion enables the signal to be further processed by the unbalanced components such as the radio frequency tuners 104-1, 104-2 . . . 104-n.

In operation, the radio frequency tuners 104-1, 104-2 . . . 104-n tune the antenna elements 102-1 to 102-n to receive the desired broadcast content transmission. The demodulators 106-1, 106-2 . . . 106-n demodulate and decode the separate content transmissions from the antenna elements 102-1, 102-2 . . . 102-n into MPEG-2 format using ATSC demodulator/decoders. MPEG-2 is a standard format for a coding of moving pictures and associated audio information.

In the typical implementation, the card cage structures 151 are located in an enclosure that is installed on the roof of a building or on an antenna tower. The multiplexer circuit 108 and data transport controller 160 are used to carry signals to the PCB optical interface connector 162. The PCB output connector 162 carries the signals to remainder of the system 100 that is typically located in a more secure location such as a ground-level but or the basement of the building.

In another implementation, each PCB antenna arrays 152 includes 80 dual loop antennas 102-1 to 102-n (for a total of 160 loops). In alternative embodiments, the PCBs are able to hold more than 80 antennas such as 320 antennas (for a total of 640 loops) or 640 antenna elements (for a total of 1,280 loops). Each antenna is approximately 0.5 inches in height, 0.5 inches wide, or about 1 centimeter (cm) by 1 cm, and has a thickness of approximately 0.030 inches, or about a 1 millimeter (mm). The antenna elements are currently organized in a staggered two dimensional matrix that is approximately 3.3 wide by 18 inches long, or about 8 cm by 50 cm. Generally, the matrix should be less than 1 m by 1 m and have more than 10 antenna elements, and preferably more than 50 elements. The antenna elements also have a horizontal spacing of approximately 0.28 inches (about 0.7 cm) and a vertical spacing of approximately 0.62 inches (1.5 cm). Additionally, the PCB antenna arrays 152 are on a raster of 1.09 inches (2.8 cm). In an alternative embodiment, the PCB antenna arrays 152 are on a raster of 0.75 inches (2 cm) or less.

In still other implementations, the PCB antenna arrays 152 and their antenna elements are different sizes. In one example, the area of the PCB antenna arrays 152 is reduced by about ¼ (possibly ⅛) of the present area or less. In terms of the antenna elements 102, when configured as a square loop, the 3 sided length is preferably less than 1.7 inches (4.3 cm), for a total length of all 4 sides being 2.3 inches, (5.8 cm). In the case of miniaturization of the antenna area to ¼ of the present size, then the aspect of the loop would also need to be changed to maintain the same pitch on the PCB and shrink the height by ¼. Likewise, the spacing between the antenna elements and raster would also be reduced depending on the size of the PCB. Still other embodiments implement geometric reductions of the area to ¼ to ⅛.

FIG. 5 is a partial side view of a PCB antenna array 152 that shows an example of the symmetry of balanced loop antenna element 102 and balanced transmission lines 812, 813 on the double sided PCB antenna array 152.

In a typical implementation, a tap point for each antenna element 102 is located at some distance according to the desired driving impedance. Then, the two component antenna element 102 is driven Pi (π) radians out of phase at the operating frequency. The frequency of the antenna element is controlled by changing the voltage across the pair of varactor diodes 904, 906 joining the loop ends of the two loop antennas element 102. A varactor diode is a diode with a controllable capacitance that is adjusted by altering the voltage applied at its terminals. In an alternative embodiment, the frequency of each antenna element is controlled with a fixed capacitor and varicap diode.

Also shown in FIG. 5 are transmission lines 812, 813 that are connected to the balun 914. The balun 914 converts the balanced signal to an unbalanced signal enabling the signal to be processed by components in the electronics section 154 of the PCB antenna array 152.

Figure 6A:
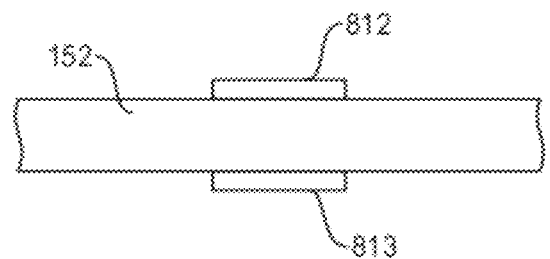
FIG. 6A is the cross-section view of section A-A from FIG. 5.

FIG. 6A is a cross-sectional view of section A-A in FIG. 5. FIG. 6A shows the symmetrical nature of the balanced transmission lines 812, 813 on opposing sides of the PCB antenna array 152. Typically, the transmission lines 812, 813 are conductive copper pathways that are formed on the top and bottom of the PCB board. In a preferred embodiment, one set of transmission lines 812 carry the positive radio frequency signal and the symmetrical set of transmission lines 813 on the opposite of the PCB carry the negative radio frequency signal.

Figure 6B:
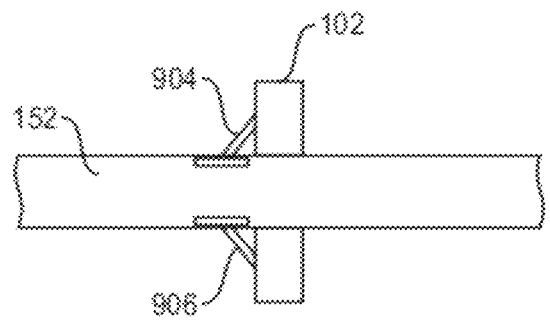
FIG. 6B is the cross section view of section B-B from FIG. 5.

FIG. 6B is a cross-section view of section B-B of FIG. 5 showing the symmetrical nature of the loop antenna element 102 and tuning varactor diodes 904, 906.

Figure 7:
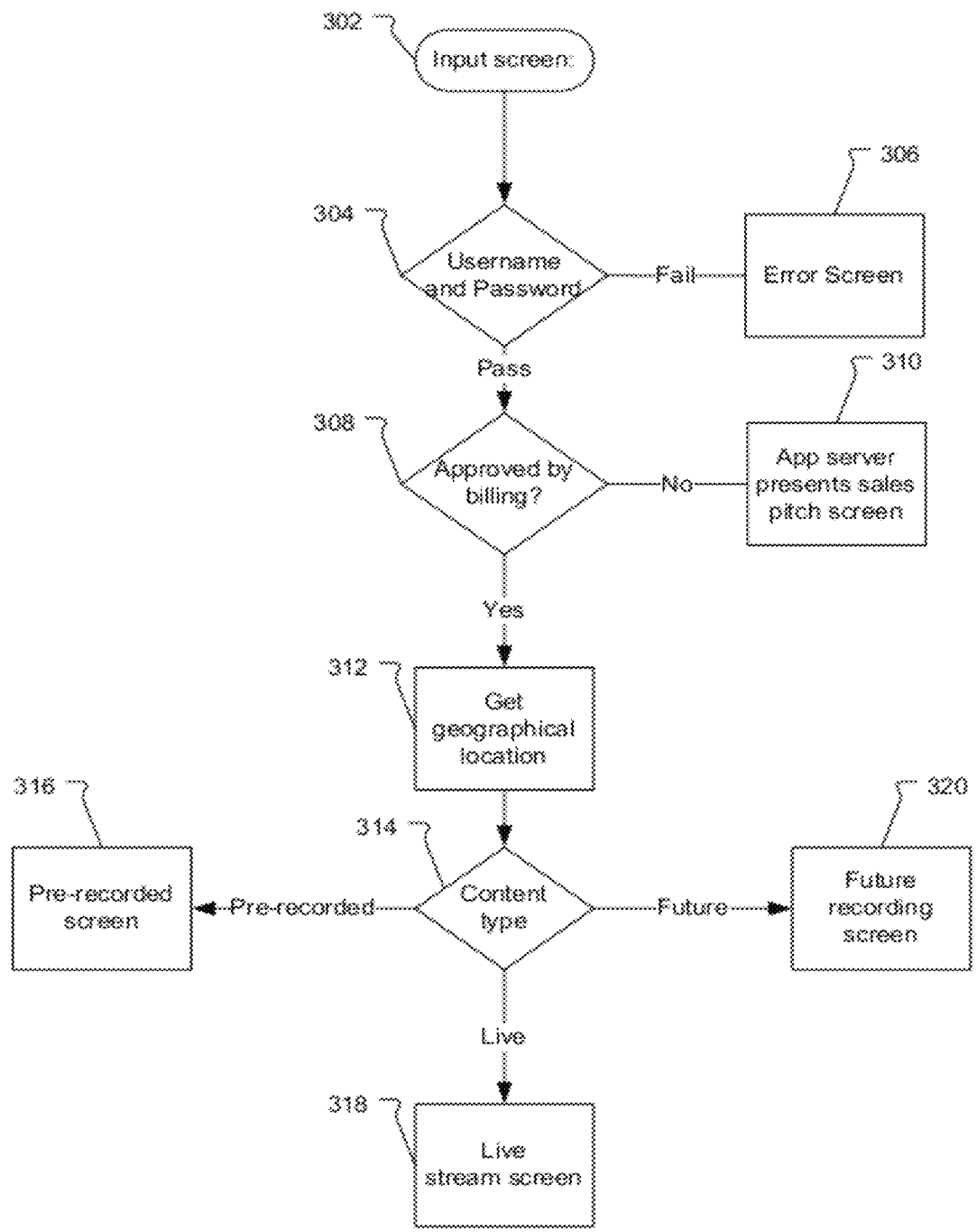
FIG. 7 is flow diagram illustrating the steps for a user to view live streaming content, set up a future recording, or view previously-recorded content.

FIG. 7 is flow diagram illustrating the steps for users to access the system 100 and view live over the air content, set up a future recording, or view previously recorded content. In the first step 302, an input screen is presented to the users via their client devices 128, 130, 132, 134. In the next step 304, the users are required to supply their user names and passwords to access individual user accounts, if not already logged-on. If the user names and passwords are incorrect, then the users are presented with an error screen in step 306.

Once logged-on, the business management system 118 determines if the users are approved for billing in step 308. If the users are not approved for the billing, then the application server 124 presents the users with a sales pitch screen in step 310, when the system is deployed with a paid-subscriber model. If the users are approved by billing, then the application server 124 gets geographical location information in step 312 for the users.

Each users' geographical location can be determined and confirmed using a number of different methods. In one example, each user's location will be determined by the user's Internet Protocol (IP) address. In other examples, it is entered by the user when they create an account or is determined when the user provides a zip code. Likewise, information from mobile phone towers being accessed by the user or by latitude and longitude coordinates from a global positioning system receiver within the user devices are also used in other examples. This geographical location information enables the web application server 124 to present each user with information based upon the user's actual or home market location.

The geographical information is required because different content is broadcast at different times between different television markets and some content is only available to users in specific geographic markets. For example, some content available in New York City is not available to users in Los Angeles. Moreover, in some implementations, the system enforces localization such that the users can only access content transmissions from their home market or that would otherwise be available to the users if they had their own antenna that they maintained on their house or other domicile.

In the next step 314, the users are able to select what content type they want to access from their individual user account. Each user is provided with their own individual account through which they access any live content streaming or set up future recordings to be associated with the user's account. Likewise, playback of previously recorded content is done from the user's account and only content associated with the user's account is accessible by the user.

If the user selects content that the user previously recorded, then the user is presented with the pre-recorded screen in step 316. If the user selects future recording, then the user is presented with the future recording screen to set up a future recording in step 320. If the user selects live streaming content, then the user is presented with the live stream screen in step 318.

Figure 8:
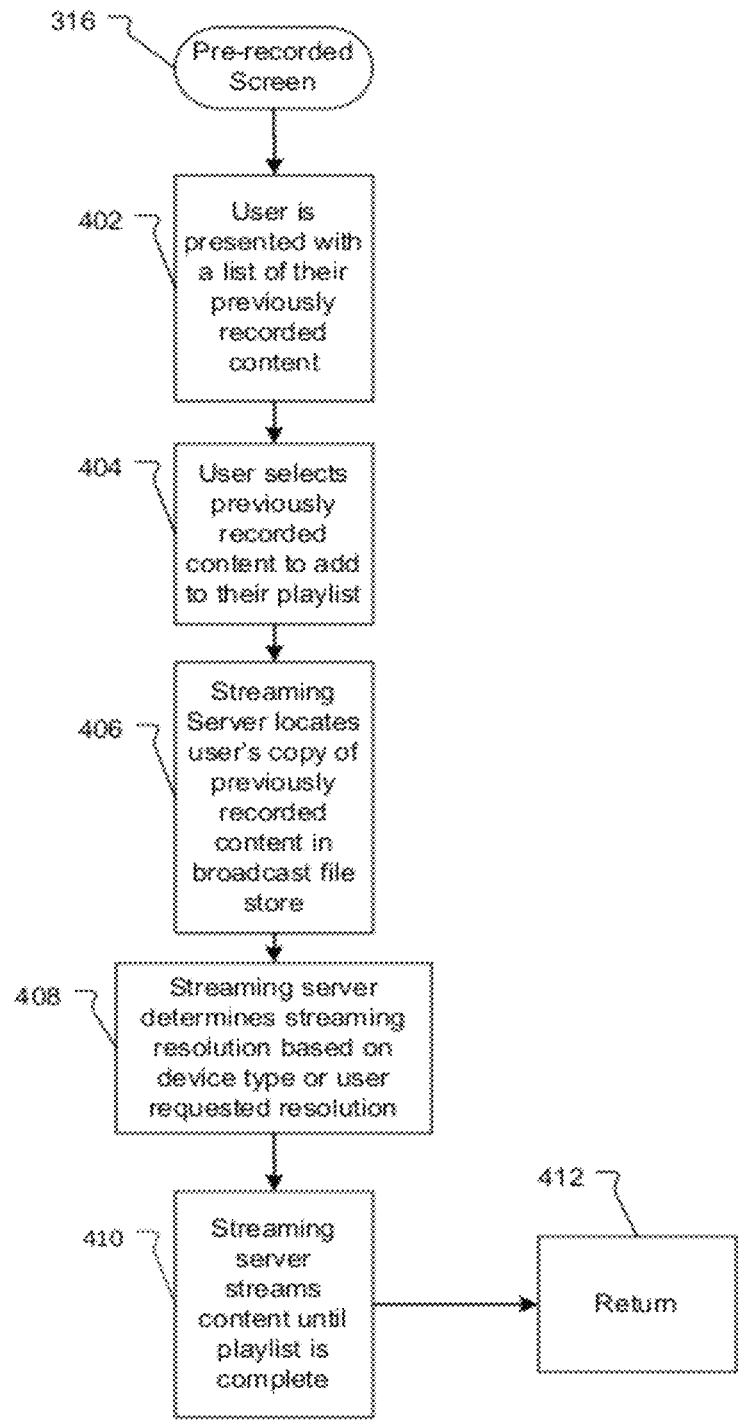
FIG. 8 is flow diagram illustrating the steps for a user to watch their previously recorded content from the playback server.

FIG. 8 is flow diagram illustrating the steps for users to watch their previously recorded content from the streaming server 120. The users begin at the pre-recording screen that is served to the user devices from the application web server 124 in step 316. This is often a web page. In other examples, a propriety interface is used between the application web server 124 and an application program running on the user devices.

In the first step 402, the users are presented with a list of their previously recorded content data. Users are only able to see the content data, e.g., a television program, that they instructed the system 100 to record. In some examples, the application server 124 suggests over the air content that the users might be interested in watching or recording. Nevertheless, the users must initiate the requests to record and save the broadcast content.

In the next step 404, the user selects previously recorded content data to add to a playlist. The streaming server 120 locates the user's unique copy of the previously recorded content data in step 406 in the broadcast file store 126. In the next step 408, the streaming server 120 determines the resolution that will be presented to the user based on the user's device. In alternative embodiments, users are able to select the resolution regardless of device.

In another alternative embodiment, the client device automatically selects the highest resolution that the communications path can reliably provide.

In the next step 410, the streaming server 120 streams the content data or recorded television program in the playlist to the user's device until the user's playlist is complete.

Figure 9:
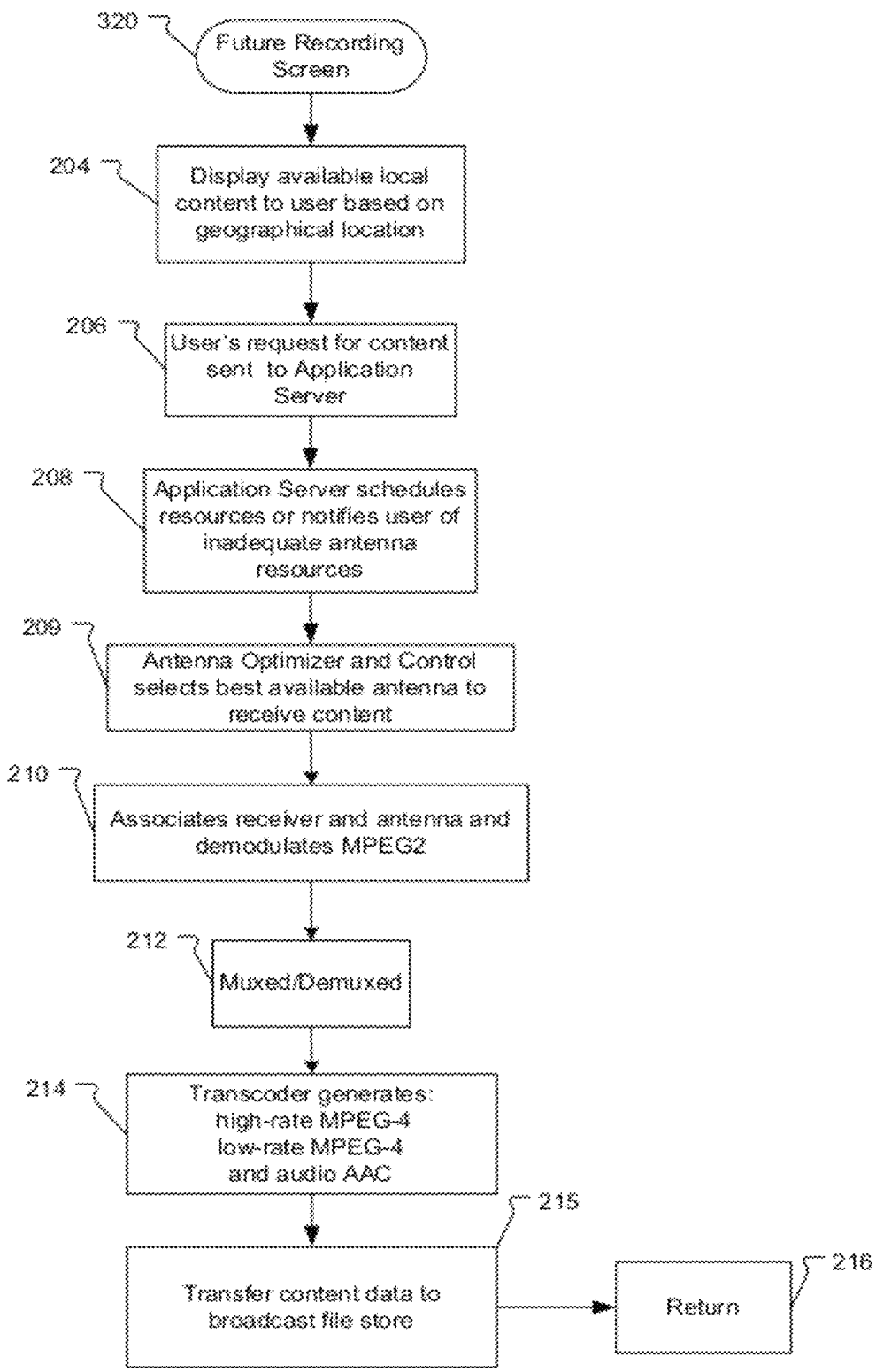
FIG. 9 is a flow diagram illustrating the steps for a user to schedule a future recording of an over the air broadcast.

FIG. 9 is flow diagram illustrating the steps for users to schedule future recordings of an over the air broadcasts.

The users begin at the future recording screen that is served to the user device from the application web server 124 in step 320.

In the first step 204, the application server 124 determines and displays available local content to the user based on the geographical location information (obtained in step 312 of FIG. 7) to enable localization. Typically, the user is presented with a list of available television networks, current broadcasts, and times and dates of future broadcasts.

In the next step 206, the user's request for content is sent to the application server 124. The application server 124 then schedules resources to be available at the time of the content broadcast or notifies the user that resources are currently unavailable in step 208. Then the application server 124 directs the antenna optimize and control 116 to allocate the best available antenna element at the time and date of the desired content broadcast in step 209. In the case where a user's antenna is assigned permanently this step is skipped, however. In the next step 210, the antenna optimize and control 116 associates the antenna and receiver, and demodulates the broadcast content into MPEG-2 format.

The system 100 enables each user to separately schedule future recordings of broadcast content. Additionally, each user is allocated an individual antenna to receive that broadcast content. Further, and generally, the application server 124 schedules recordings based on each users' command so that there is always the same number of recordings as scheduled requests. This applies even when two users request recordings of the exact same content transmission; the system captures and stores separate content transmissions for each user individually so that each user has their own unique copy in the file store 126 that was generated from a separate antenna element.

In the next step 212, the content transmission is transmitted through multiplexor and demultiplexor to an assigned transcoders that is part of receiver. In the next step 214, the assigned transcoder 112 generates both a high rate/resolution and low rate/resolution video stream of transcoded content transmission data. In a current embodiment, the transcoded content data are encoded into the MPEG-4 format and the audio is transcoded into AAC (advanced audio coding) format.

The transcoded content data are then transferred to the broadcast file store 126 in step 215 along with time index information at both the high rate/resolution and low rate/resolution video content data.

In an alternative embodiment, the transcoder 112 generates a tri-rate output. Generally, the tri-rate includes high, medium, and low rate/resolution outputs of the transcoded content data. Still other embodiments could have greater or fewer output rates. The different output rates/resolutions enable the system 100 to provide different quality video streams based on factors such as the network capabilities, the user device, and user selection, to list a few examples.

Figure 10:
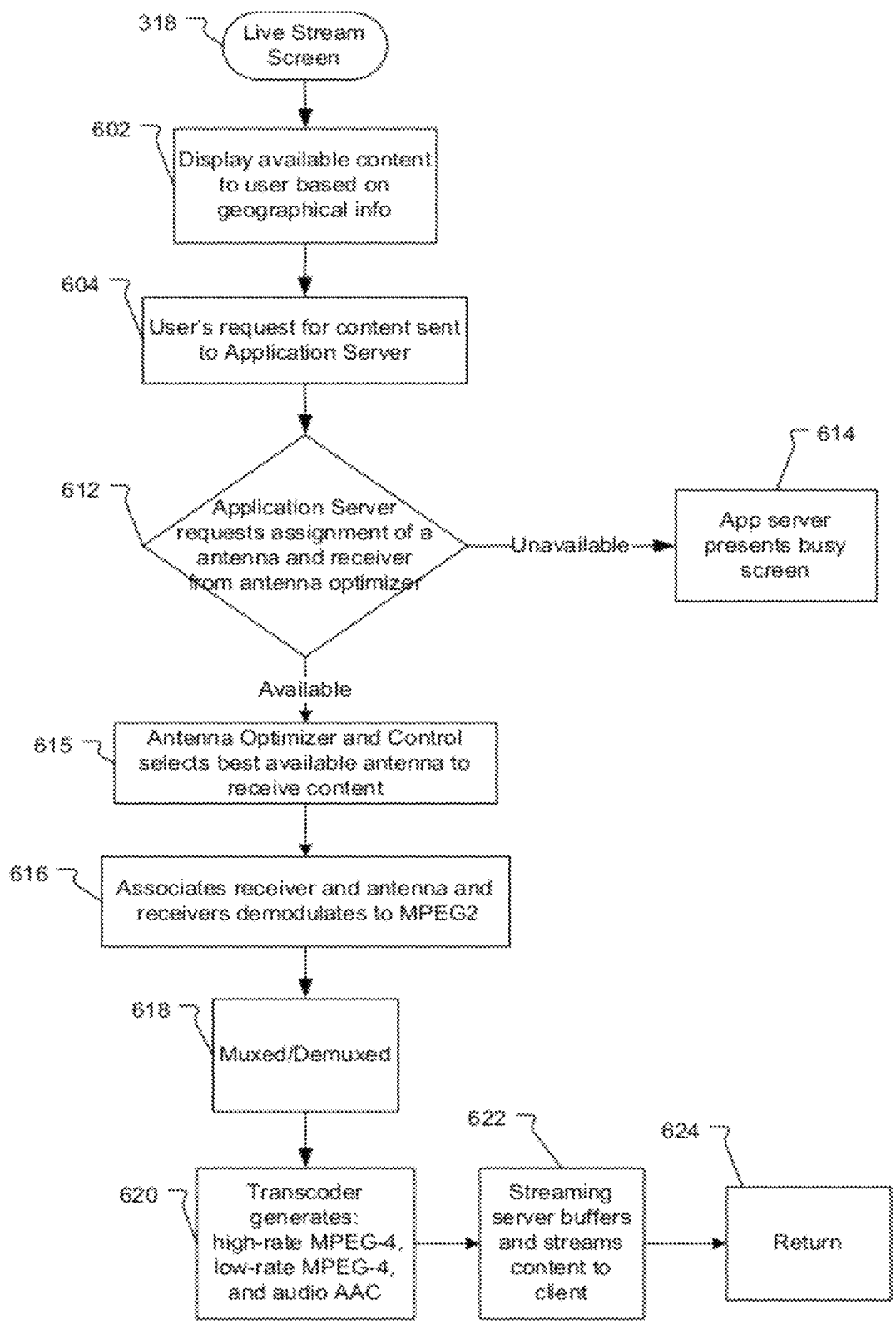
FIG. 10 is a flow diagram illustrating the steps for a user to watch over the air content on a device in real-time.

FIG. 10 is a flow diagram illustrating the steps for users to watch over the air content on user devices in real time, contemporaneously with the broadcast of the content transmission of the desired television programs.

The users begin at the live stream screen 318 that is served to the user devices from the application web server 124. Based on the user's geographical location, a list of available over the air broadcasts of television programs is provided in step 602. Additionally, the broadcast time and date are also displayed to the users. The users are able to select content to view and the users' requests for content are sent to the application server 124 in step 604. The application server 124 requests assignment of an antenna element from the antenna optimize and controller 116 in step 612 of each of the users.

If the antenna and/or tuner are not available, then the application server 124 returns a busy screen to the users in step 614. If antennas are available, then the antenna optimization and controller 116 selects the best available antenna to receive the over the air broadcasts in step 615 for each of the users' requests. The determination of which antennas to use is based on multiple factors. For example, the location of the broadcasting entity, the location of the antenna elements, the orientation of the antennas, and the signal strength are all factors used to determine which antenna element will be used. In the case where the user's antenna is permanently assigned, and there are insufficient resources to support the request, the system returns a busy screen.

After an antenna is selected and the over the air broadcast is received, it is processed by the encoder system 103. The content transmission is decoded into MPEG-2 format by the decoder in step 616. In the next step 618, the content transmission data are transmitted through the multiplexer 108 and demultiplexor 110 to the transcoders 112. Here, the assigned transcoders 112 generate both a hi-rate and low rate MPEG-4, in one example, and the audio is transcoded into AAC (advanced audio coding) format. The assigned indexer 114 stores the transcoded broadcast content data into the broadcast file store 126 along with time index information.

Next, the streaming server 120 buffers and streams the broadcast content data from the broadcast file store 126 to the users' mobile devices for the duration of the broadest in step 622.

In one embodiment, antenna elements that are currently not used are allocated to receive content broadcasts or television programs that the system anticipates that users will want to watch in the near future. The feeds from these allocated antennas are not sent to any users. The generated content data are simply discarded by the system as they are generated or are written into a circular buffer in the file store that is continuously overwritten. However, when a user desires to watch one of these programs, the content data that are generated by the feed from the antenna elements are allocated to that user and streamed to that user.

The advantage of this approach is that when the user selects to watch a new television program or changes to a different television program in a live streaming situation, the system does not need to wait for the encoding pipeline to fill. Instead, the content data that were previously discarded are now simply sent to this user. This provides a smoother and quicker transition when switching between channels, e.g., channel surfing.

FIG. 11 illustrates how transcoded content data are stored for each individual user in the broadcast file store 126.

In the illustrated example, each record includes information that identifies the user and the transcoded content data. For example, a user identification field uniquely identifies each user and/or their individual user account. Every content transmission that is captured from over the air broadcasts and converted to content data is associated with the user that requested it. The content identification field identifies the title (or name) of the content transmission. Generally, the content name is the title of the program, show or movie that is being recorded. An antenna identification field identifies the specific antenna element that was assigned and then used to capture the user requested over the air broadcast. A network identification field specifies the broadcasting entity that broadcast the content transmission that was recorded. The video file field contains the transcoded content data or typically a pointer to the location of this data. The pointer specifies the storage location(s) of the transcoded and stored as high, medium and low quality broadcast content data. A file identification field further identifies the unique episode, movie, or news broadcast. Lastly, a time and date identification field records the time and date of the over the air broadcast.

By way of an example, User 1 and User 2 both have unique USER ID's and both have their individual copies of a television program. Likewise, both users have their own copy of the broadcast content data and the television program even though both users requested a recording of the same television program, at the same time, on the same network. User 1 is only able to view their content data stored to their USER ID and User 2 is only able to view their copy of the content data stored to their USER ID. Likewise, the specific antenna element that was assigned to each user is also recorded.

Additionally, the streaming server 120 is able to generate reports based on the stored broadcast content data and the identification fields. The reports include statistics such as usage by individuals, usage by groups, total the numbers of users, number of active users, number of scheduled recordings, peak system usage, and total usage of the entire system, to list a few examples.

Figure 12:
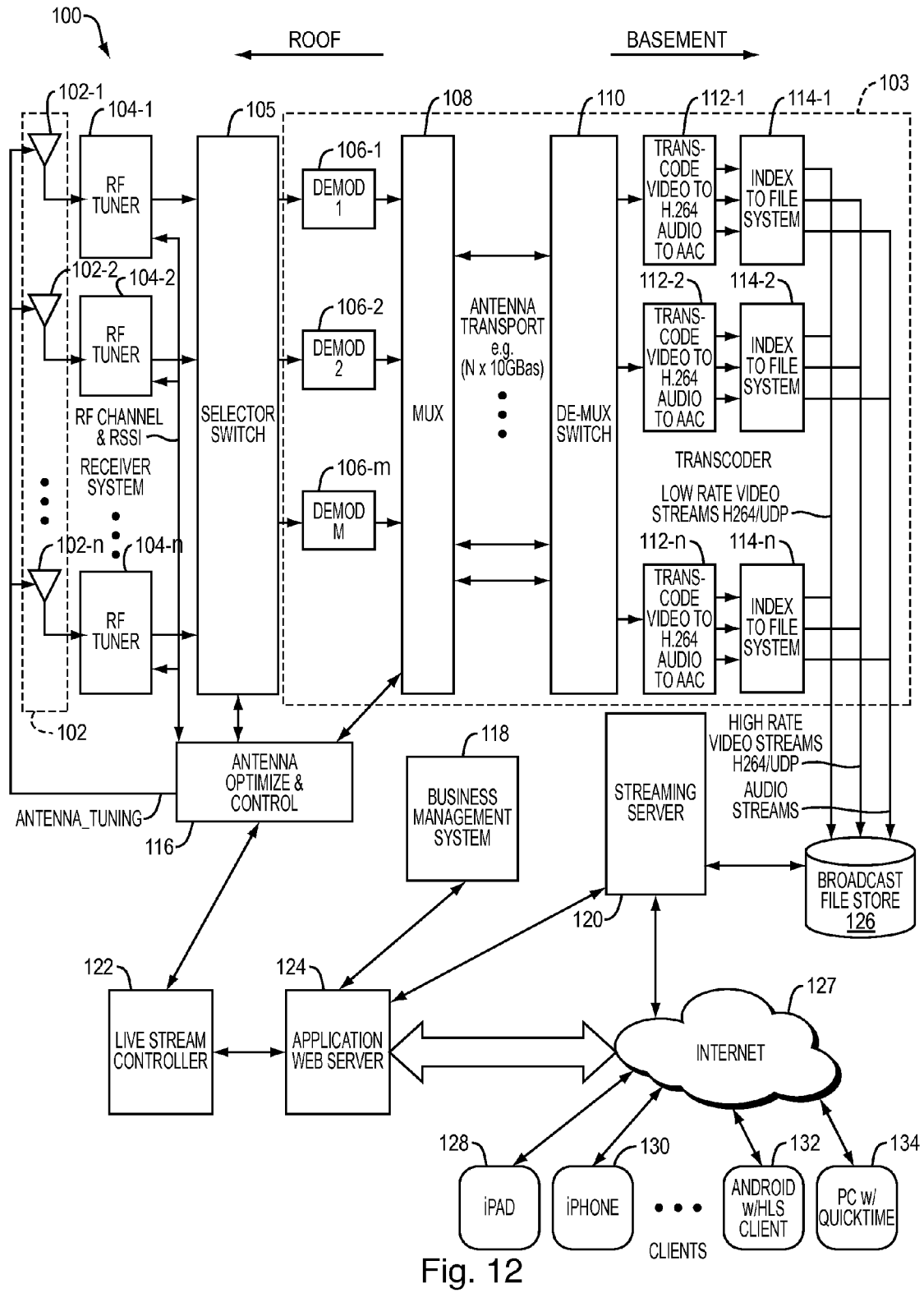
FIG. 12 is schematic block diagram showing an embodiment of the system for the capture and distribution of television content that utilizes pooled receiver resources.

FIG. 12 shows an alternative embodiment of the system 100 for providing network access to antenna elements of an array.

In this example, the system 100 further includes a selector switch 105 that is controlled by the antenna optimize and control system 116 to selectively connect the antennas 102 and tuners 104 to available antenna processing pipelines.

In the system 100, the resources for demodulating and transcoding are pooled and shared by the antennas elements. This configuration enables the system to provide services to larger numbers of users with less hardware. Additionally, the density of antenna elements can be increased, while power consumption is reduced by remoting demodulation and transcoding hardware that consume larger amounts of power and by having less resources idling in standby.

Pooling resources (or oversubscription) is an acceptable practice because users generally do not access the system at the same time. Typically, most users are not currently accessing the system: some users are viewing live streaming content, some are setting up recordings of future broadcast, and others are playing back previously recorded content. Thus, the system does not need to be provisioned to handle all users accessing the system simultaneously.

To enable the system to utilize pooled resources, the selector switch 105 or switching system is provided. The antenna optimize and control 116 controls the selector switch 105 to enable the over the air broadcast received by the antenna elements 102 to be demodulated and encoded by resources from the pool of resources. Once the demodulation and encoding resources are no longer required, they are returned to pool of resources.

Because there are more antennas than demodulating and encoding resources, the antenna optimize and control 116 must ensure that demodulation resources are available before allocating an antenna to a user or allowing the user to access their dedicated antenna. Therefore, when a user makes a request for content, the antenna optimize and control 116 determines if demodulation and encoding resources and antenna elements are available on the same antenna array PCB or whether demodulation and encoding resources are available on the same PCB and the user's dedicated antenna.

If antenna resources are not available on the same antenna array PCB, then the antenna optimization and control system 116 searches for resources on other antenna array PCBs. If no resources are available, then the antenna optimize and control 116 informs the application server 124 that the user's request cannot be completed at this time. Likewise, the application server returns a message to the user's device that the system is currently busy and requests cannot be completed at this time.

On the other hand, if demodulation and encoding resources are available, then the user is assigned an antenna element and the received broadcasts are transmitted to the available resources through a selector switch 105 (or switch matrix).

In an alternative embodiment, tuners 104-1 to 104-$n$ are also pooled. In this configuration, available tuners are assigned to antenna elements 102 as needed. The selector switch 105 is also used to switch the radio frequency output of the antenna and to select both the tuner and demodulator to be directly coupled together.

In a preferred embodiment, the signal inputs and outputs of the selector switch 105 are a low intermediate frequency signal, a high intermediate frequency signal, a baseband signal, or a digital representation of any of the foregoing.

While an equal number of antennas, tuners, demodulators, transcoders, and indexers are depicted, in a typical implementation, antenna elements outnumber the encoding resources of the processing pipeline approximately 3-4 to 1, in one embodiment. This configuration provides additional service to many additional users without concomitant increases in hardware resources.

In first mode of operation of the embodiments shown in FIGS. 1 and 12, the antenna assignments are temporary assignments that last only as long as the users are actively using the system 100 to watch single television program, for example. If the system 100 assigns users antenna elements each time there is a user request to view or record an over the air broadcast. Thus, every time a user requests a different over the air broadcast, the system 100 typically assigns the user a new antenna element.

In second mode of operation, the antenna assignments are permanent assignments, e.g., dedicated to particular users. For example, antennas are leased to users for the duration of those users' accounts. In other examples, the antennas are actually sold to users.

If the system 1800 is configured to permanently assign antennas to users, then each user will always use the same antenna element to receive over the air broadcasts.

The embodiment of FIG. 12 is preferred for the second mode of operation because fewer demodulators 105 and possibly tuners 104 are required in the system 100. When a user is not accessing their system, only their antenna element 102 is not fully utilized. The switch 105 enables demodulators to be reassigned to other active antenna elements.

If the system 100 is configured to permanently assign antenna elements and also utilizes pooled demodulation and encoding resources, there is the possibility that demodulation resources will not be available on the same antenna array PCB at certain times. In this scenario, the antenna optimize and controller 116 searches for available demodulators on other antenna array PCBs and controls the selector switch 105 to enable the antenna elements located on one PCB to connect to the demodulation and encoding resources located on other PCBs.

Figure 13:
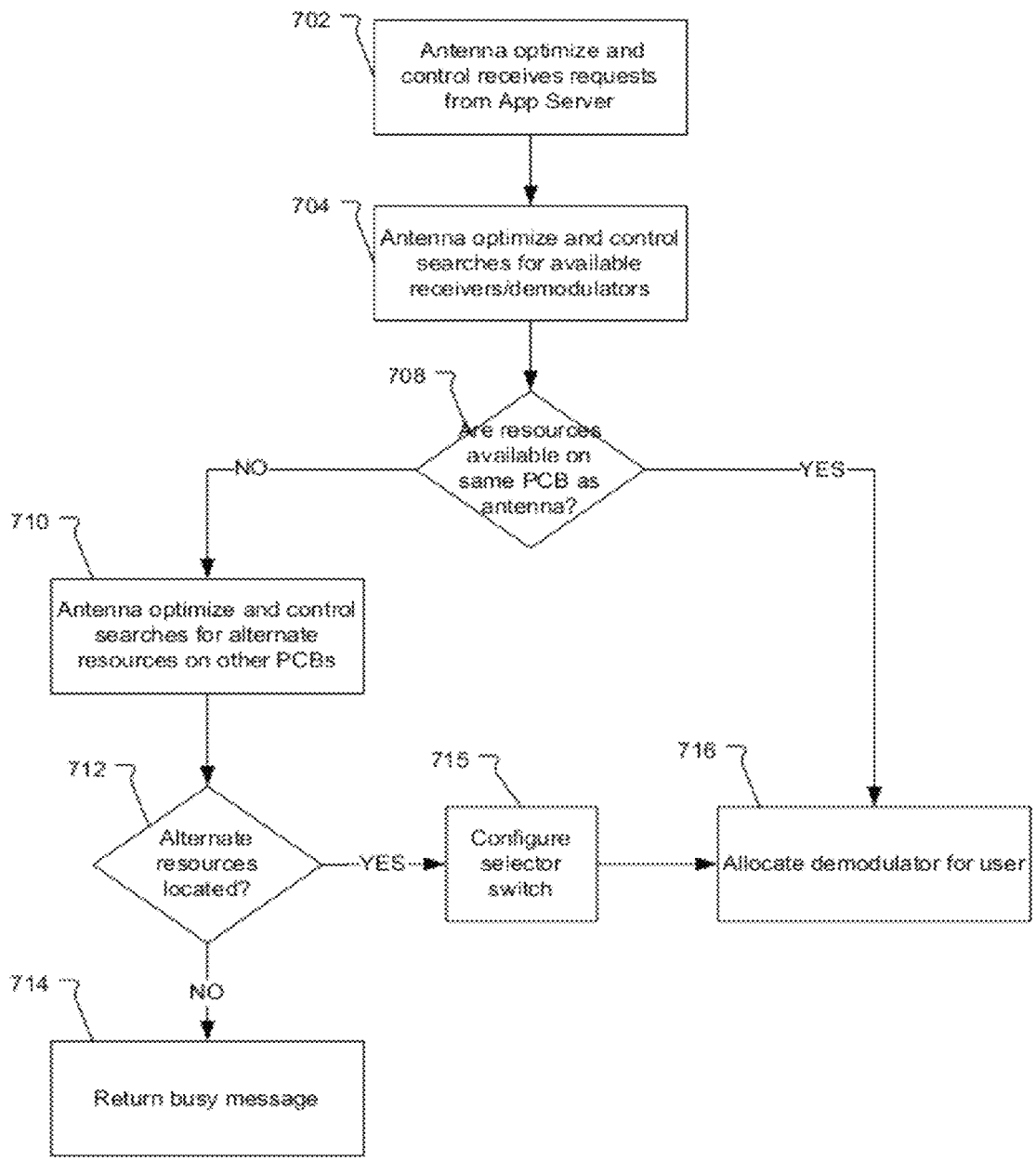
FIG. 13 is a flow diagram illustrating how the application web server and antenna optimize and control search for resources located on other printed circuit boards.

FIG. 13 is a flowchart that shows how the application web server 124 and antenna optimize and controller 116 allocate demodulation and encoding resources for a user when resources are pooled.

In the first step 702, the antenna optimize and control 116 receives a request from the application server 124. Typically, the requests are generated by users from their client devices 128, 130, 132, 134. After receiving the request from the application server 124, the antenna optimize and control 116 searches for available resources.

In the next step 708, the antenna optimize and control 116 determines if demodulation and encoding resources are available from the pool of resources on the same antenna array PCB as the antenna element that is assigned to the user making the request. If resources are available, then the antenna optimize and control 116 allocates the resources for the user in step 716. Generally, this is accomplished by configuring the selector switch 105.

If no resources are available, then the antenna optimize and control 116 searches for other resources on the other antenna array PCBs that are available to receive the requested content in step 710. If the antenna optimize and control 116 is not able to locate any available antennas and/or demodulation and encoding resources on any other PCBs, then the antenna optimize and control 116 returns an busy message in step 714 to the application server. Likewise, the application server 124 will then return a busy message to the user requesting the content.

If antennas and resources are located on another antenna array PCB, then the antenna optimizes and control 116 configures the selector switch 105 in step 715 and allocates the available demodulator for the user in step 716.

These steps would also be performed if the user requested to set up a future recording. The steps, however, would not be performed in real-time; rather they would be performed at the time when the desired content was being broadcast from the broadcasting entity. Additionally, the content would not be delivered to a user device. Rather, the content would be stored in the broadcast file store 126 to be accessed by the user at a later time.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of streaming television content transmissions from over the air broadcasts to user devices, the method comprising:
   presenting users with a list of available television content transmissions, wherein the list of available television content transmissions is based on the over the air broadcasts available in a geographical location of each of the users;
   receiving requests from the users to receive selected television content transmissions among the available television content transmissions;
   allocating individual antenna elements, in an array of the antenna elements, to each of the individual users, so that different antennas elements simultaneously capture multiple copies of the same television content transmissions when different users want to receive the same television content transmissions, a tuner for the allocated antenna element tuning the antenna element to receive the television content transmission requested by each of the individual users to which the antenna element was allocated;
   receiving the selected television content transmissions with the antenna element and storing separately for each of the individual users;
   demodulating feeds from the antenna elements to generate unique content transmission data having MPEG-2 encoding for each of the individual users when the users have selected to receive the same television content transmission;
   transcoding the content transmission data of each of the individual users to content data for each of the individual users, the content data having a different encoding supported by a device of each of the individual users; and
   streaming the selected television content transmissions to the user devices as the transcoded content data.

2. The method as claimed in claim 1, further comprising tuning the antenna elements to receive the selected television content transmissions from broadcasting entities.

3. The method as claimed in claim 1, wherein the content transmission data are transcoded from MPEG-2 to MPEG-4 encoding.

4. The method as claimed in claim 1, further comprising transcoding the content transmission data to content data at two or more different resolutions.

5. The method as claimed in claim 4, further comprising streaming the transcoded content data to the user devices with a resolution determined based on resolution of the user devices.

6. The method according to claim 1, further comprising storing the selected television content transmissions in a file store prior to streaming the selected television content transmissions to the users.

7. The method according to claim 6, wherein the file store stores the selected television content transmissions in a separate location for each individual user.

8. The method according to claim 1, further comprising assigning the antenna elements to the users from available antenna elements based on which antenna elements are optimized to receive the selected television content transmissions of the users.

9. The method according to claim 1, wherein each of the individual users are only streamed the selected content transmission received by the antenna element allocated for each of the individual users.

10. The method according to claim 1, further comprising assigning antenna elements on the fly as the users request the television content transmissions.

11. The method according to claim 1, further comprising dedicating antenna elements to users that are used to fulfill the requests for the television content transmissions.

12. A system for streaming television content transmissions to user devices, the system comprising:
    an array of antenna elements, each of the antenna elements for receiving broadcast television content transmissions;
    tuners for the antenna elements, each of the tuners for tuning an antenna element to receive the television content transmissions so that different antennas elements simultaneously capture multiple copies of the same television content transmissions when different users want to receive the same television content transmissions;
    demodulators for demodulating and decoding feeds from the antenna elements to generate unique content transmission data for each of the individual users when the users have selected to receive the same television content transmission;
    transcoders for converting the content transmission data of each of the individual users to content data for each of the individual users, the content data having a different encoding supported by the device of each of the individual users;
    an application server presenting users with a list of available television content transmissions that are based on over the air broadcasts available in a geographical location of each of the individual users, wherein the application server receives requests from the user devices to receive selected television content transmissions among the available television content transmissions;
    an antenna controller that allocates individual antenna elements within the array to receive the selected television content transmissions and to store separately for each of the individual users with a tuner for the allocated antenna element tuning the antenna element to receive the television content transmission selected by the user to which the antenna element was allocated; and
    a streaming server that streams the selected television content transmissions as the transcoded content data to the user devices.

13. The system as claimed in claim 12, wherein the content transmission data are converted from MPEG-2 to MPEG-4 encoding by the transcoders.

14. The system as claimed in claim 12, wherein the transcoders convert the content transmission data to the content data at two or more different resolutions.

15. The system as claimed in claim 14, wherein the streaming server streams the transcoded content data to the user devices with a resolution determined based on resolution of the user devices.

16. The system according to claim 12, further comprising a file store for storing the transcoded content data prior to streaming the user devices.

17. The system according to claim 16, wherein the file store stores the transcoded content data in a separate location for each individual user.

18. The system according to claim 12, further comprising the antenna controller allocating the antenna elements to the users from available antenna elements based on which antenna elements are optimized to receive the selected content transmissions.

19. The system according to claim 12, wherein the users are only streamed the selected television content transmission received by the antenna element allocated for each individual user.

20. The system according to claim 12, wherein the antenna controller assigns the antenna elements on the fly as users request the television content transmissions.

21. The system according to claim 12, wherein the antenna controller dedicates the antenna elements to users that are used to fulfill the requests for content transmissions the television.

* * * * *